(12) United States Patent
Marczyk (10) Patent No.: US 7,580,903 B2
(45) Date of Patent: Aug. 25, 2009

(54) PROCESS FOR THE CREATION OF FUZZY COGNITIVE MAPS FROM MONTE CARLO SIMULATION GENERATED META MODEL

(75) Inventor: Jacek Marczyk, Sondrio (IT)

(73) Assignee: Complex Systems Engineering, Inc.

( * ) Notice: Subject to any disclaimer, the term of this patent is extended or adjusted under 35 U.S.C. 154(b) by 331 days.

(21) Appl. No.: 10/532,079

(22) PCT Filed: Oct. 24, 2003

(86) PCT No.: PCT/US03/33747

§ 371 (c)(1),
(2), (4) Date: Apr. 21, 2005

(87) PCT Pub. No.: WO2004/039131

PCT Pub. Date: May 6, 2004

(65) Prior Publication Data

US 2006/0074819 A1    Apr. 6, 2006

Related U.S. Application Data

(60) Provisional application No. 60/420,928, filed on Oct. 24, 2002.

(51) Int. Cl.
*G06N 5/00* (2006.01)
(52) U.S. Cl. .............................. 706/2; 706/45
(58) Field of Classification Search .................... 706/1, 706/2, 45; 703/2; 702/19; 700/28
See application file for complete search history.

(56) References Cited

U.S. PATENT DOCUMENTS

| | | | | |
|---|---|---|---|---|
| 6,110,214 A | * | 8/2000 | Klimasauskas | 703/2 |
| 6,421,612 B1 | * | 7/2002 | Agrafiotis et al. | 702/19 |
| 6,950,712 B2 | * | 9/2005 | Ulyanov et al. | 700/28 |

* cited by examiner

*Primary Examiner*—Wilbert L Starks, Jr.

(57) ABSTRACT

A process for the computer creation of fuzzy cognitive maps (see FIG. 7) that are used to explore causal relationships between a group of factors and a phenomenon. These fuzzy cognitive maps are constructed using the data derived from Expanded Meta Models. These Expanded Meta Models are generated from Monte Carlo simulations that supply the factors under investigation with values, then by incrementing or decrementing these factor values one can generated an Expanded Meta Model.

33 Claims, 13 Drawing Sheets

PROCESS FOR THE CREATION OF FUZZY COGNITIVE MAPS FROM MONTE CARLO SIMULATION GENERATED META MODEL

CROSS-REFERENCE TO RELATED APPLICATIONS

This is a continuation of U.S. provisional application 60/420,928, filed on Oct. 24, 2002.

BACKGROUND

This invention relates to a process for generating fuzzy cognitive maps from a Monte Carlo simulation-generated Meta Model. Using this invention, one can identify variables that have a positive or negative correlation with a phenomenon. This invention also aids in improving phenomena by moving correlating variables towards targets.

It is difficult to identify those factors that have a significant contribution to the outcome of a phenomenon, a phenomenon such as Apartheid South African politics (see FIG. 7), the behavior of an axle on a car, or the failure of a containment vessel in a nuclear reactor. In the present invention, Applicant uses a process to identify those factors that have a significant contribution to the behavior of a phenomenon by using a computer to create a fuzzy cognitive map (FCM).

A fuzzy cognitive map (FCM), is a graph of an event, function, or process that shows the factors or concepts involved in the event, function, or process, and how those factors/concepts influence each other to create a phenomenon. The FCM includes all the factors or concepts that cause or influence the event, function, or process, and the relationships between the factors/concepts. FCMs have historically been drawn by hand by individual experts based on their knowledge of and experience with the event, function, or process. Using this invention, one can use a computer to generate a FCM.

Figure 7:
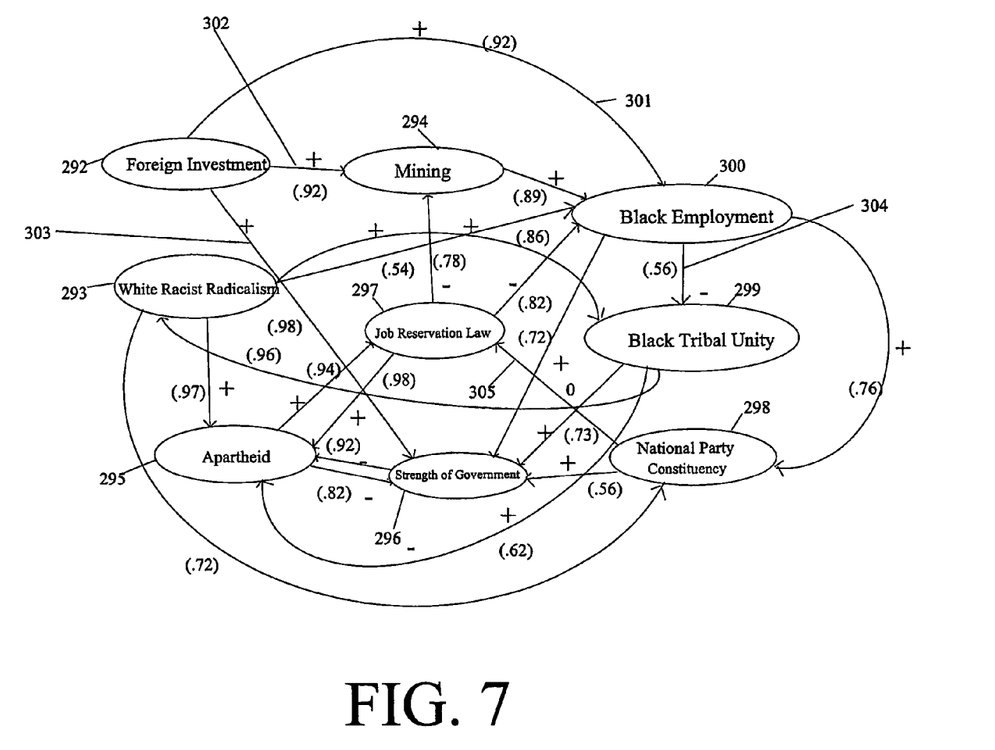
FIG. 7 shows a Fuzzy Cognitive Map (FCM) representing politics in Apartheid South Africa.

An example of these factors/concepts can be seen in FIG. 7, which is a fuzzy cognitive map of Apartheid South African politics. In FIG. 7 a short description of each factor is enclosed in an ellipse. The relationships of these factors are shown as arrows connecting the factors. The arrows have a direction and a value between +1 and −1. The value of the number indicates the influence (or causality) of one factor/concept on another factor/concept:

A value >0 means that there is a positive influence or causality (when a factor/concept increases then another factor/concept will increase).

A value <0 means that there is a negative influence or causality (when a factor/concept increases then another factor/concept decreases).

A computer generated FCM is created from a Meta Model generated from Monte Carlo simulations. A Monte Carlo simulation randomly selects the values for the input variables. Monte Carlo is a random number generation process similar to rolling dice or flipping a coin. These Meta Models create a finite, non-redundant set of rules that state "if A then B, with probability P." A and B are factors or concepts in the model with P being the direction and magnitude of the arrow showing the influence or causality of A on B.

A meta-model, described in Marczik, J. *Principals of Simulation-Based Computer-Aided Engineering, FIM Publications*, Barcelona, September 1999 (herein incorporated by reference), page 47, is a stacked matrix consisting of all the inputs and all the outputs from a Monte Carlo simulation. The matrix has a row for each Monte Carlo sample and columns for each input and output that goes into the simulation. Using a Monte Carlo simulation, one can take variability and uncertainty into account for every input variable in a problem. Each Monte Carlo run will have different values for the input variables in an analysis. The value of each input variable is randomly selected from all the values within a range of potential values for that variable. A simulation can have any number of variables. Generally, the more variables that one includes, the more realistic the simulation will be.

The outputs of the Monte Carlo runs are different values as each Monte Carlo run has different inputs. Fifty to one hundred Monte Carlo samples are sufficient to obtain useful statistical information on the outputs.

The Monte Carlo method is independent of the problem being simulated. Each run using Monte Carlo is one analysis of that particular problem, event, function, or process. Each particular type of problem, event, function, or process is analyzed using an equation known as a solver. The process being described is independent of the field of application, however for the process to work the field of application has to have solvers that are known to be accurate in modeling reality. While FCMs have been applied in fields as diverse as politics, economics, medicine, and history; the automatic generation of FCMs using this process is limited to those fields that have accurate solvers (formulas that accurately show interactions). The science and engineering fields are the most likely initial applications for this process. In the present invention, when the terms equation or equations are used, we are referring to solvers.

SUMMARY

The present invention is a process for the generation of fuzzy cognitive maps from Monte Carlo simulation-generated Meta Models that identify variables that have a positive or negative correlation with a phenomenon. This invention also aids in improving phenomena by moving correlating variables towards targets.

DRAWING FIGURES

In the drawings, closely related figures have the same number, but different alphabetic suffixes.

DETAILED DESCRIPTION OF THE PREFERRED EMBODIMENT

Figure 1A:
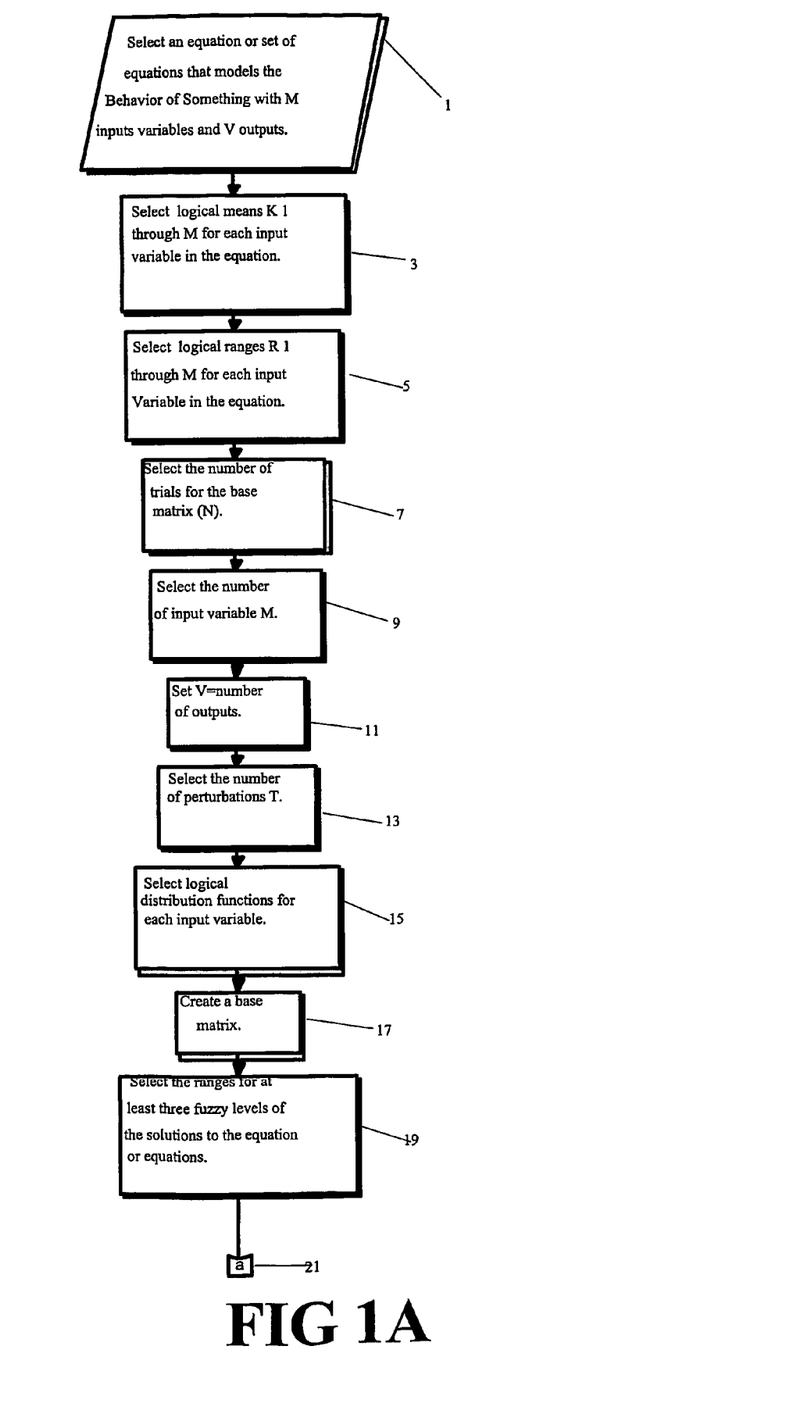
FIGS. 1A and 1B show a single process overview flow diagram that is connected at 21.
Figure 1B:
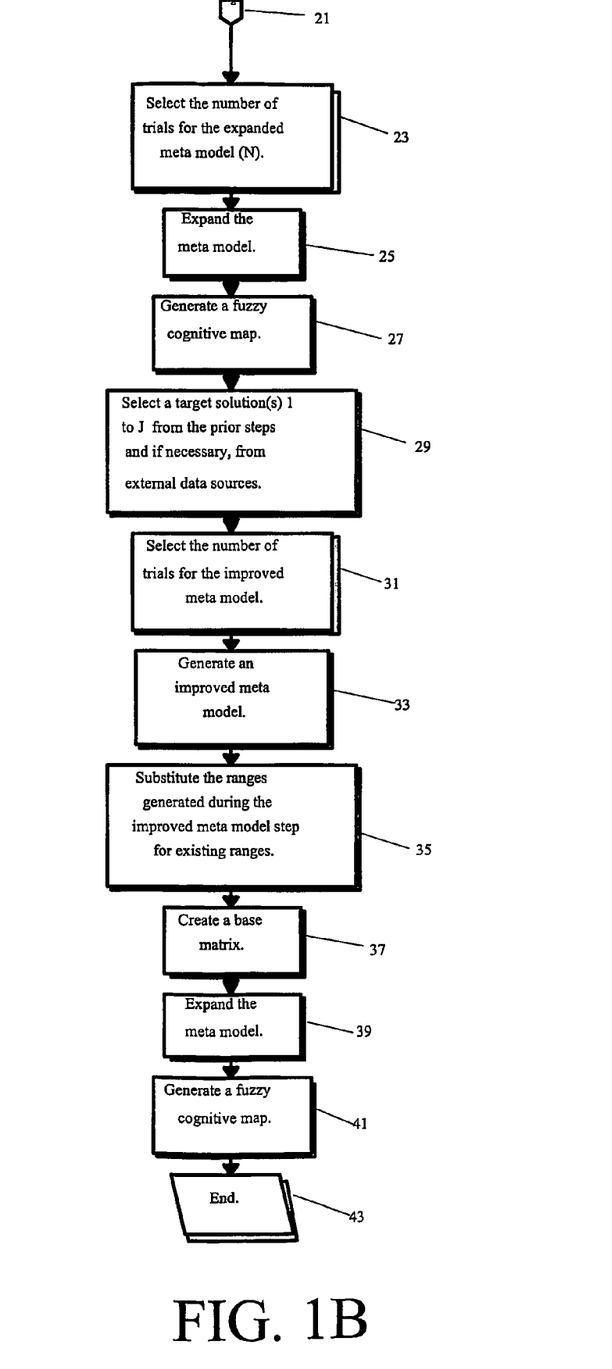

An overview of the process for generating fuzzy cognitive maps and desirable value ranges for input variables can be found in the flow diagrams in FIGS. 1A and 1B (joined at 21).

In FIG. 1A, one can see the prerequisites for the first step of the process of creating a Meta Model. First, an equation or set of equations is selected 1 (FIG. 1A) to model a phenomenon. Let's select, as an example, the simulation of the force on an object. It is known that the force is equal to the mass of the object, m, times the acceleration of the object, a, or F=ma. Next, the logical mean for each input variable is selected 3. In this example, limiting our selection to integers, we will assume that the mean of the mass variable is 5 units and the mean of the acceleration is 10 units. The logical range for each input variable is then selected 5. In this example the range for mass can vary from 4 to 6; the range for mass is plus or minus 1 unit from the mean. The acceleration can vary from 8 to 12 units; the range is plus or minus 2 units from the mean of 10 5. At this time we must decide on the number of trials N that must be run 7. We must also count the number of input variables M 9 and the number of outputs V 11; in our example the number of input variables are two and the number of outputs is one. Next, one selects the logical distribution function, such as a normal distribution 15, or any other type of distribution equation that approximates the distribution that is generated by experimentation or by extrapolation from experience.

Creating a Base Matrix (17)

Figure 2:
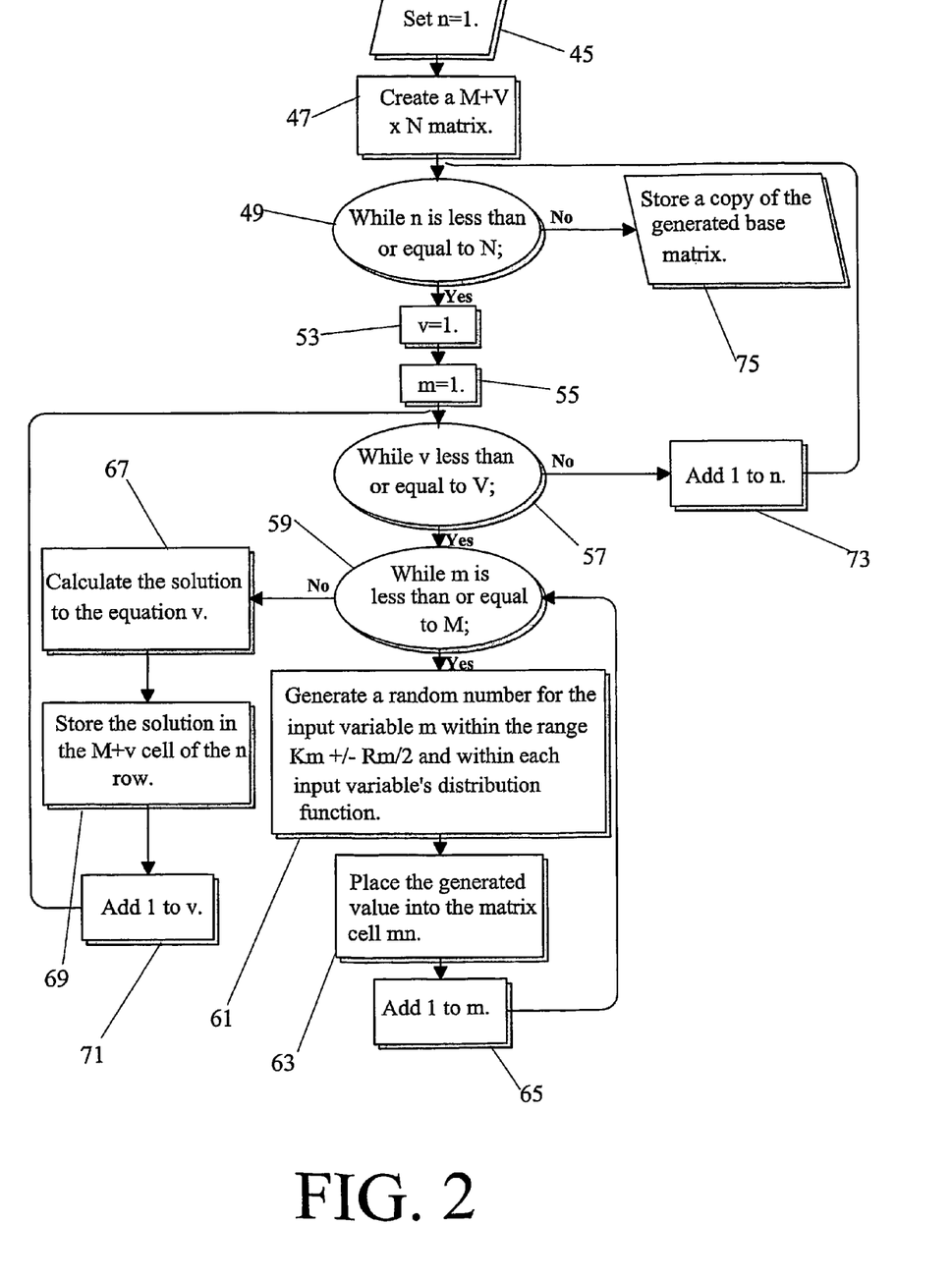
FIG. 2 is a flow diagram that shows the process for generating a base matrix.

FIG. 2 shows the process for generating a base matrix. The process for creating a base matrix begins by initializing variables (see steps 45, 53, and 55 in FIG. 2). One also creates an empty matrix with the number of columns equal to the number of input variables plus the number of output variables 47. One then populates the empty matrix created in step 47, row by row, with input variable values, within each input variable's specified range, as generated random numbers that conform to the desired distribution function for that input variable 61 and are placed in the input variable's cell 63. When all input values are generated in a row (see 59 and 65), one calculates the solution to each equation 67 using the input values generated at step 61 and stores each value in the appropriate cell 69. This process continues until all equations are solved (see steps 71 and 57). After an entire row of the base matrix has been populated, the generated row is stored in the relevant row of the base matrix 69. This process is repeated for the remaining rows (see 73 and 49) until the base matrix is totally populated. The base matrix is then stored 75. The generated base matrix 78 for our two input variables and one output variable can be found in FIG. 3.

Figure 3:
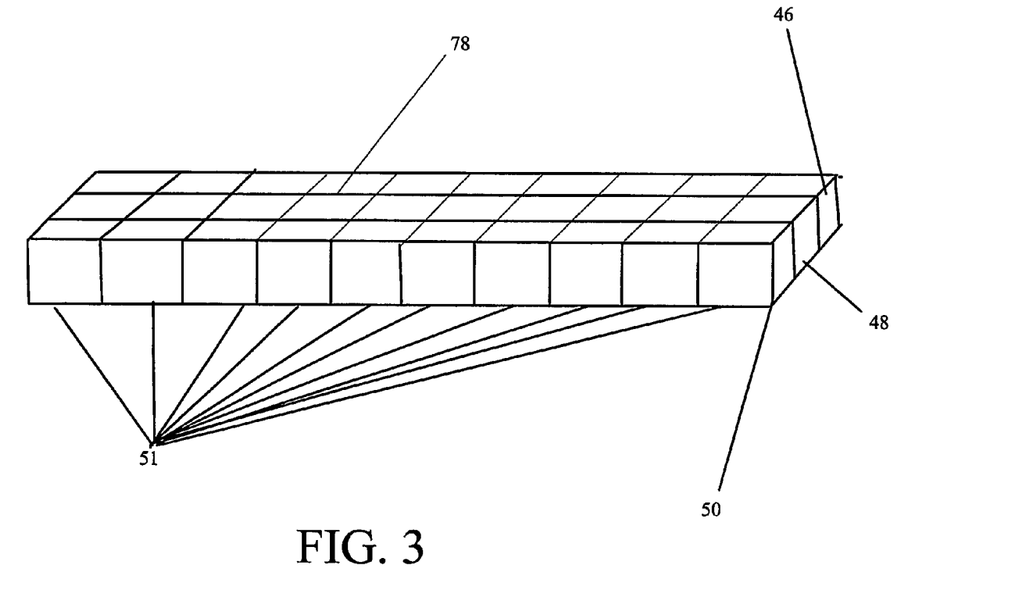
FIG. 3 shows two input variables with one output variable base matrix.
Figure 4A:
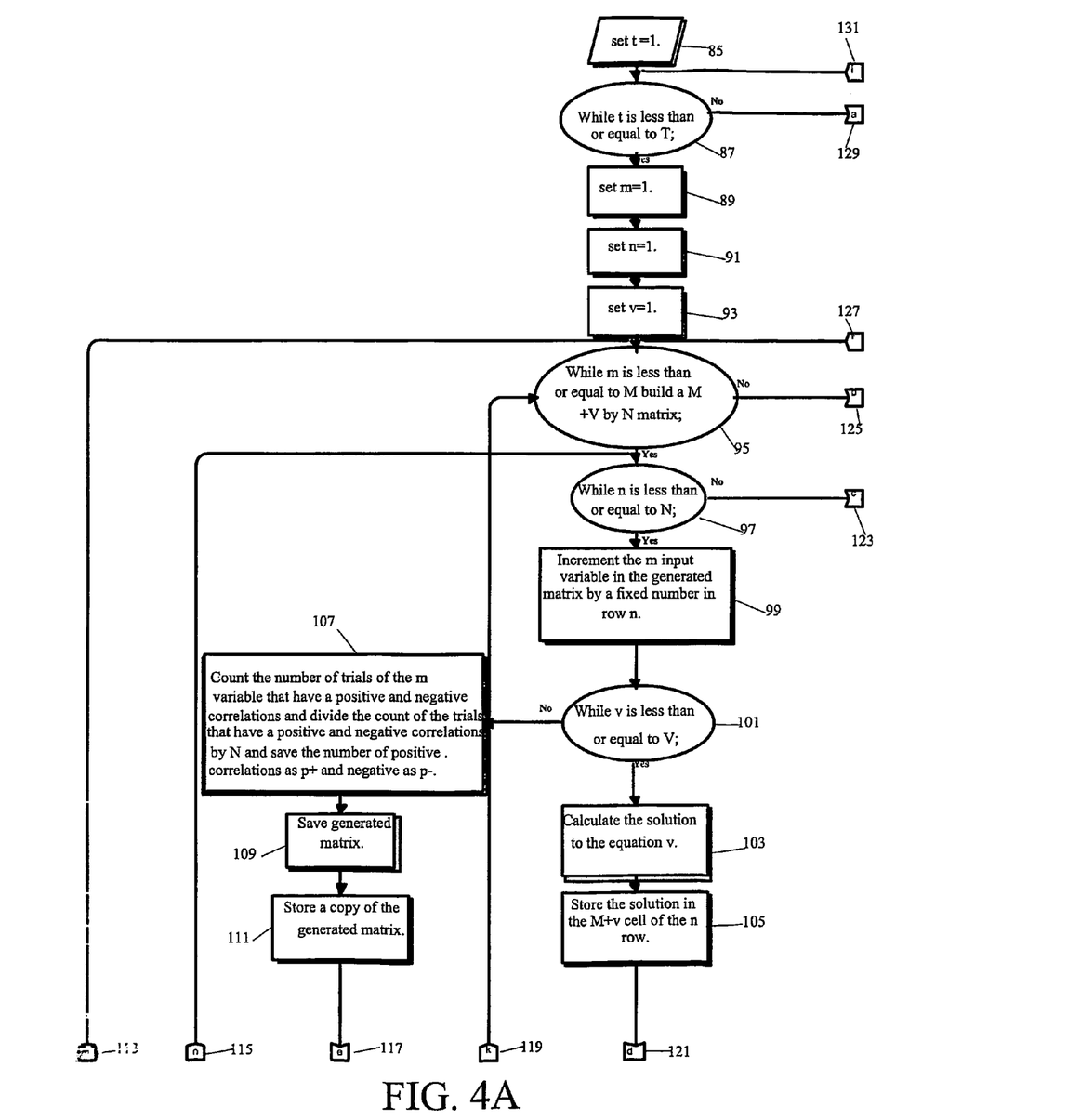
FIGS. 4A, 4B, 4C and 4D are a flow diagram that shows the process for expanding a Meta Model. The flow diagram is connected at 131, 129, 127, 125, 123, 113, 115, 117, 119, 121, 149, 151, and 187.
Figure 4B:
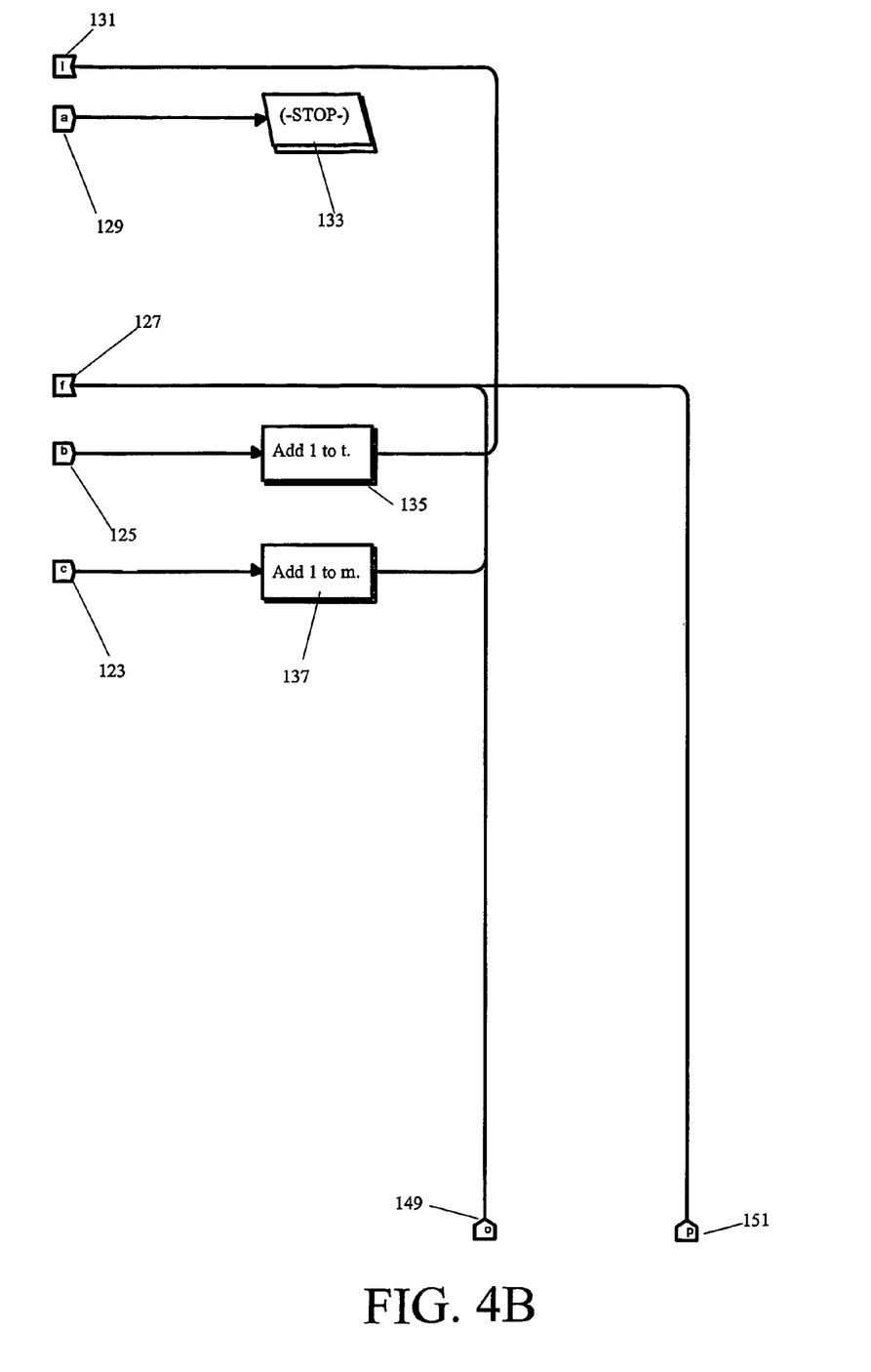
Figure 4C:
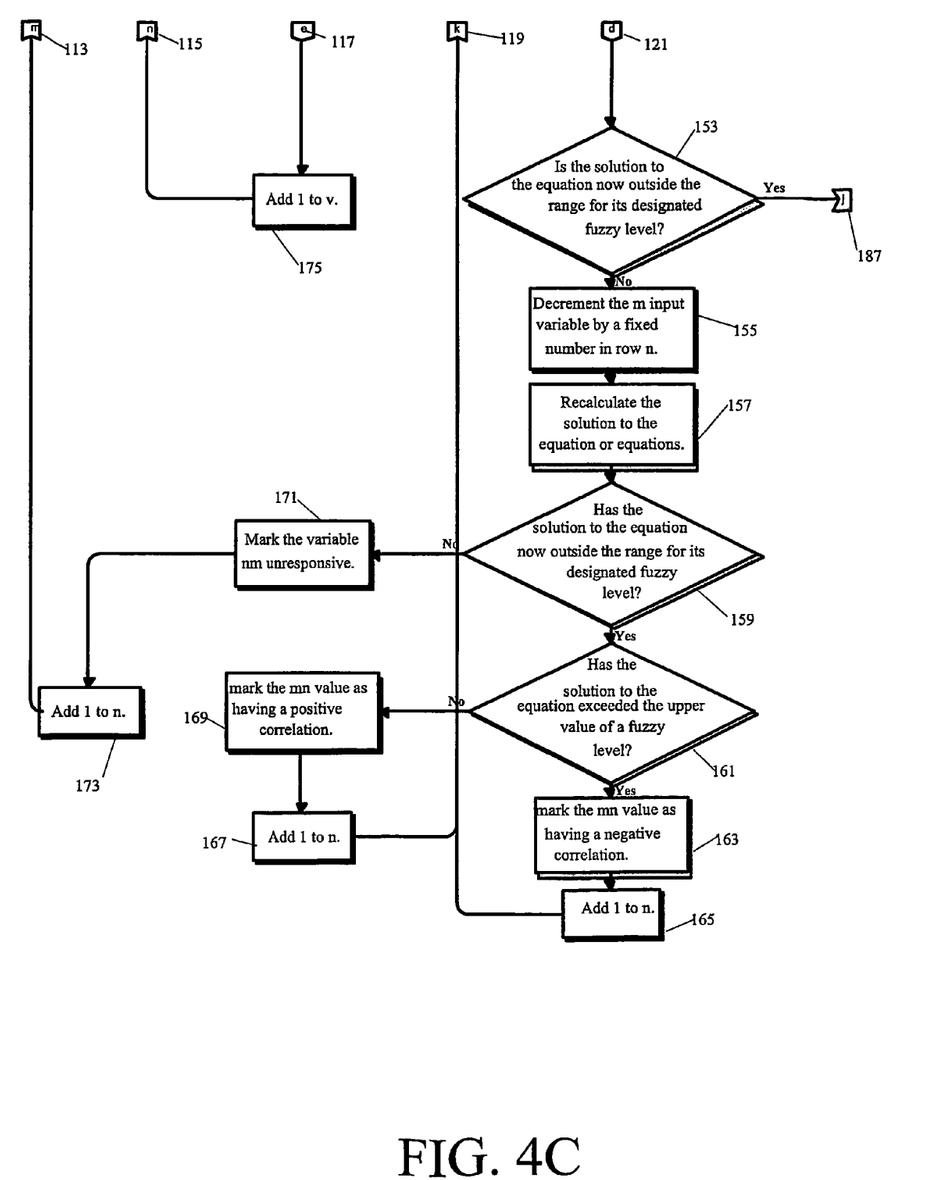
Figure 4D:
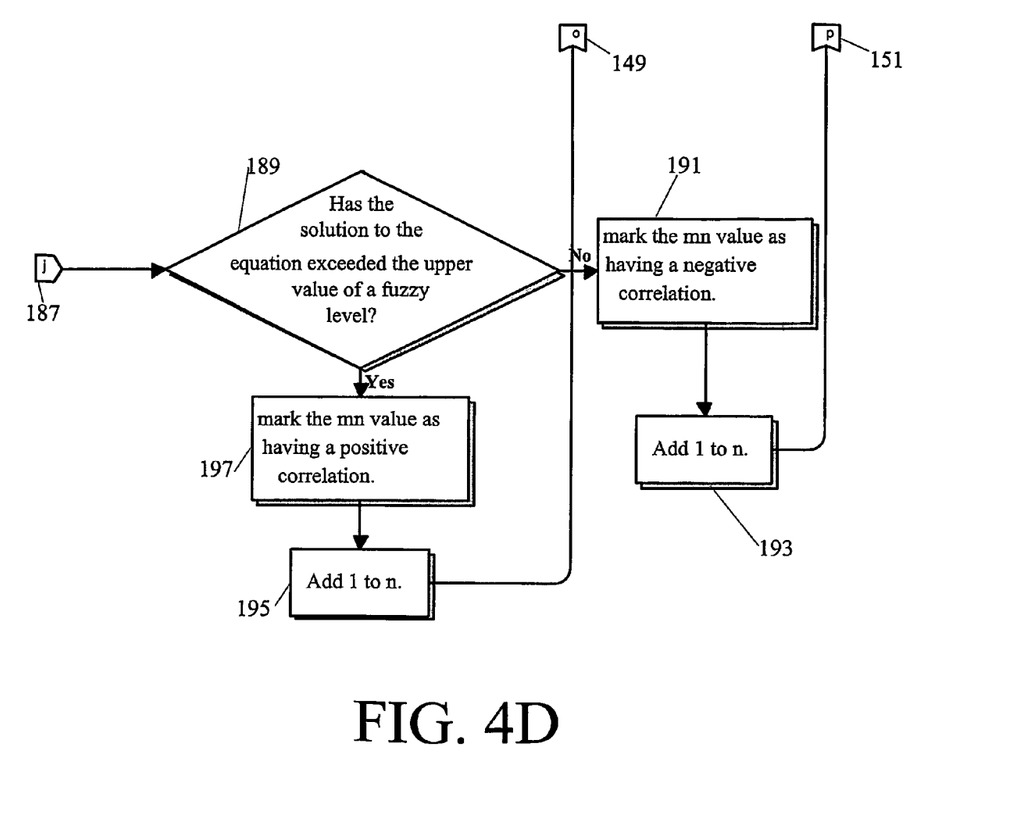

Each row 51 of the base matrix 78 represents one trial. The first two columns 50 and 48 are the generated input values for the input variables. The last column 46 contains all output values.

In our example, the numbers in the base matrix for ten trials are:

| m | a | F |
|---|---|---|
| 5 | 10 | 50 |
| 5 | 11 | 55 |
| 4 | 10 | 40 |
| 5 | 8 | 40 |
| 6 | 9 | 56 |
| 5 | 12 | 60 |
| 5 | 10 | 50 |
| 6 | 9 | 54 |
| 4 | 11 | 44 |
| 5 | 8 | 40 |

This Base matrix of an actual problem will be much larger, with n input variables (x1, x2, x3, x4, . . . , xn) and m outputs (y1, y2, y3, . . . , ym) and N Monte Carlo samples with N usually being from 50 to 100. The base matrix can be graphically viewed from any combination of 2 or 3 inputs and outputs with each view having N points.

Expanding the Meta Model (FIG. 1B 25)

FIGS. 4A, 4B, 4C and 4D show the process for expanding the Meta Model. One expands the Meta Model by first selecting the number of expansions or perturbations T that will be required {see FIG. 1A 13). Next, one selects the number of trials for the expanded Meta Model (FIG. 1B 23). Then one selects fuzzy levels for the solutions to the equations (FIG. 1A 19). These fuzzy levels represent a region of the solution space of an equation, demarcated by fuzzy level boundaries, whose members have at least one common characteristic. One typically calls one region high and another region low, but the number of fuzzy levels one could create can be more than three. One could create a Meta Model with 5 fuzzy levels, i.e., the base matrix, very low, low, high, and very high.

Figure 5:
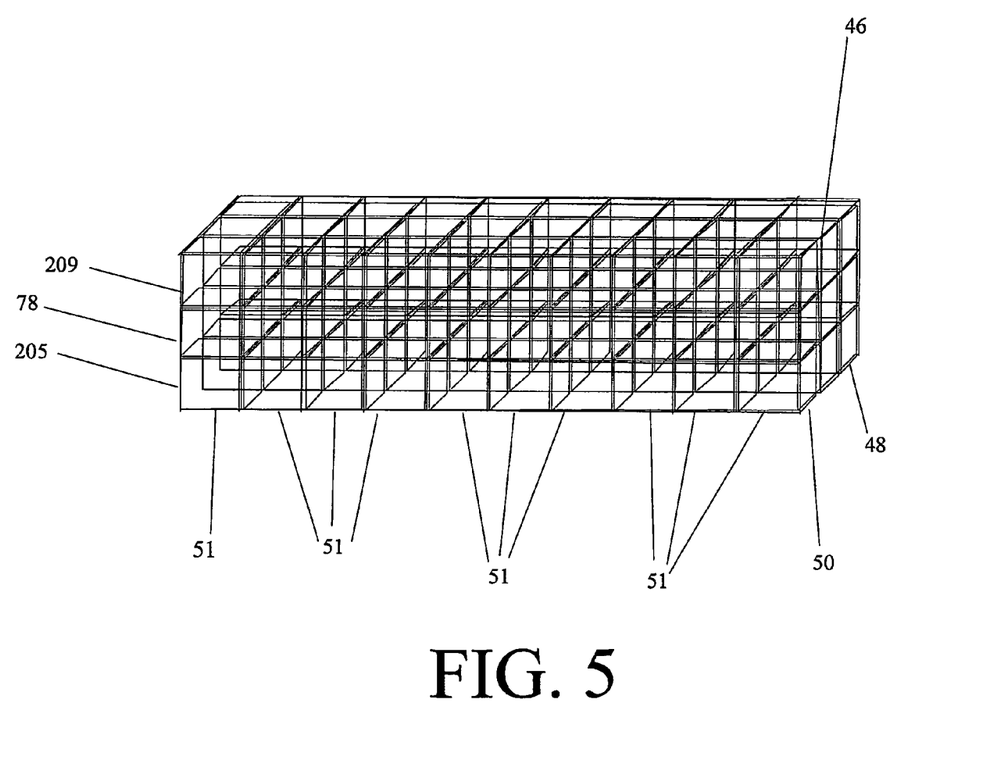
FIG. 5 shows an expanded Meta Model.

A Meta Model with three defined fuzzy levels can be seen in FIG. 5 with the base matrix 78 generated in the first stage of the process wedged between the values that have a high values 209 (fuzzy level) and low values 205 (fuzzy level).

In most instances, one perturbation will be sufficient to create an expanded Meta Model. Next, values will be initialized (see FIG. 4A 85, 89, 91 and 93). Next, the values of a single input variable in a single column (see example columns 48 or 50 in FIGS. 3 and 5) are incremented by a fixed value 99 and the output value of an equation is calculated 103. This output value of the equation is then stored in the matrix 105. Has the output value jumped to another fuzzy level 153? If the value does jump to another fuzzy level 153 and if the solution to the equation jumps to a higher value fuzzy level 189, then that input variable has a positive correlation 197. If the output value jumps to a lower fuzzy level then the output variable has a negative correlation 191. If the increase in the input variable value does not result in a jump to another level of the output value, the non-incremented value is decremented 155 and the output value of one of the equations is recalculated 157 and retested (see 159 and 161). If the decremented input value jumps to a higher fuzzy level then that input variable has a negative correlation 163. If the value jumps to a lower fuzzy level, then that input variable has a positive correlation 169. If there is no change in levels, the variable is non-responsive 171.

This testing for a correlation is repeated for each trial of a given variable (see 97, 165, 167, 193, 195 and 173). Once an entire column representing a given input variable is tested, one counts the number of trials that have positive and negative correlation's. These counts of the number of positive and negative correlation's are counted and the count numbers are divided by the total number of trials to get positive (p+) and negative (p−) 107. Then the generated matrix 109 and a copy of the generated matrix are stored 111. This process continues for each equation (see 101 and 175) and for each of the remaining input variables (see 95 and 137).

This cycle for building this Meta Model can be repeated T times (see FIG. 1A 13, 87, 133, and 135) to gain insights into the dynamic relationships between the various factors (input variables) and a phenomenon.

Process of Generating a FCM from a Meta Model

The inputs and outputs contained in the Meta Model are the factors/concepts contained in the FCM (the A's and B's in the set of rules that state "if A then B, with probability P"). The results of expanding the Meta Model 39 supply the information required to generate a fuzzy cognitive map 41.

Using Meta Models, causal links have now been identified that show how all the input variables influence the output variables in the presence of variation. The set of rules created by expanding the Meta Model are used to create a FCM in which all the input variables (A's) and output variables (B's) are the factors or concepts involved in an event, function, or process. The relationships between the factors/concepts are provided by the sign of the causal link (positive or negative) and the probability P.

In our example, an increase in the level of input variable x1 (mass m) will result in an increase of output y1 (force F). An increase in the level of input variable x2 (acceleration a) will also result in an increase of output y1 (force F). In our example, the relationships between the input variables and the output variable will be positive with probabilities of 1.

When a computer program generates a FCM from the data generated by expanding the Meta Model, the diagram (see FIG. 7), it will map the relationship between an input variable and a phenomenon (output) that has the highest probability, with the arrows directed from the input variable to the phenomenon (output). For example, in the FCM of the Apartheid South African politics (FIG. 7), if White Racist Radicalism 293 has a 0.72 positive correlation for producing a National Party Constituency 298 and there is a 0.06 negative correlation between White Racist Radicalism 293 and a National Party Constituency, what is displayed on a FCM is 302—a 0.72 positive correlation (see also Kosko, B., *Neural Networks and Fuzzy Systems*, Prentice Hall International Editions, 1992, herein incorporated by reference).

In FIG. 7, there are a number of notable correlation's. For example, there is a very strong 0.98 positive relationship 303 between Foreign Investment 292 and the Strength of Government 296, a very strong 0.92 positive relationship between Foreign Investment 292 and Mining 294 (see 302), a very strong 0.92 positive relationship between Foreign Investment 292 and Black Employment 300 (see 301) and there is a moderately strong 0.56 negative relationship between Black Employment 300 and Black Tribal Unity 299 (see 304). The National Party Constituency 298 has no effect on the Job Reservation Law 297 (see relationship 305). Other factors that influence and were influenced within Apartheid South African politics include Apartheid 295 and White Racist Radicalism 293.

Manipulating a Fuzzy Cognitive Map (FCM)

One can generate an improved Meta Model 33 by moving the Meta Model. The Meta Model is moved to get improved outputs, such as reduced weight or cost while maintaining the ability of the product to perform. A new FCM is then built from the new Meta Model using the process previously described.

Figure 6A:
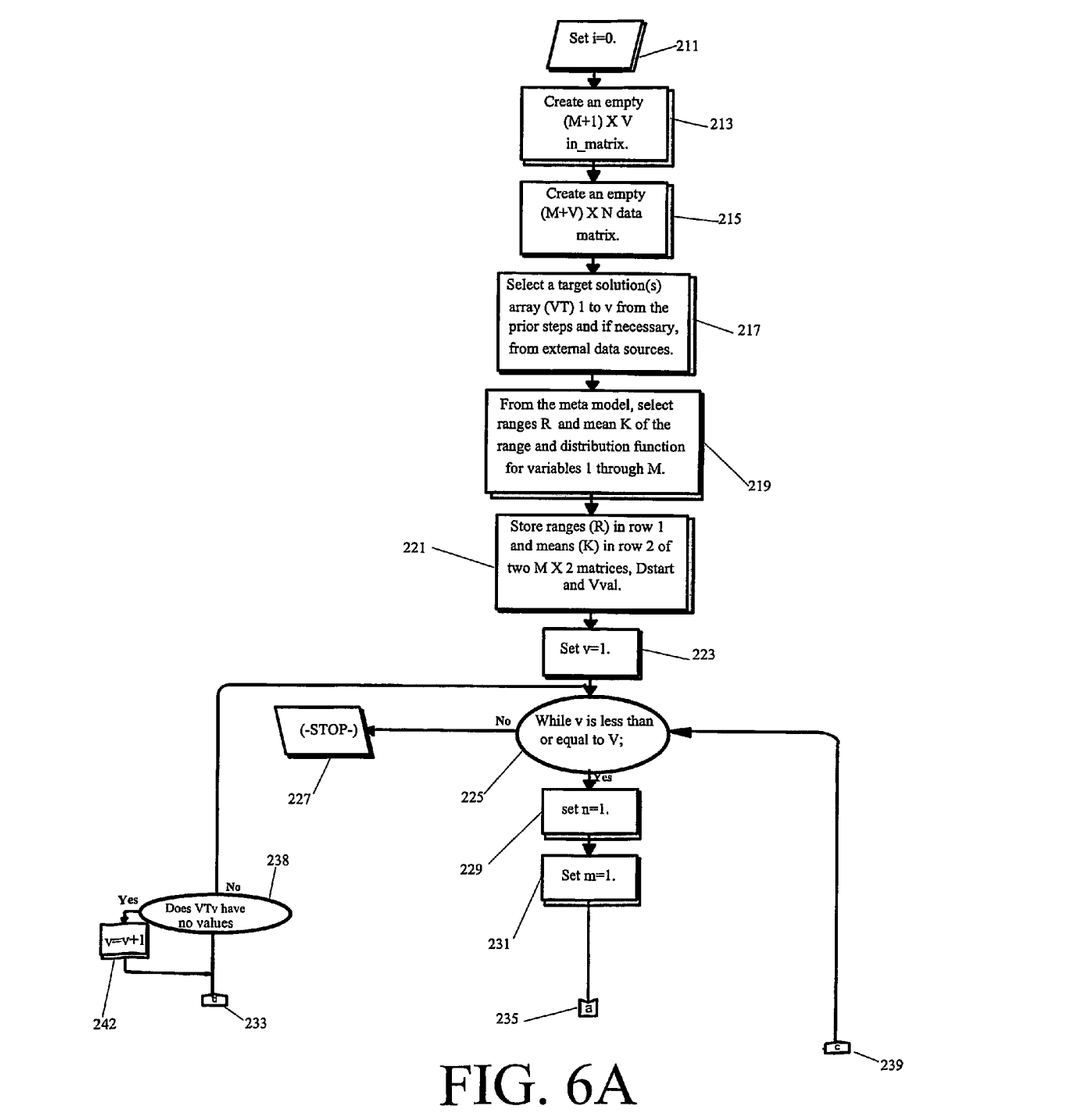
FIGS. 6A, 6B, and 6C are a flow diagram that shows the process for improving a Meta Model. The flow diagram is connected at 233, 235, 237, 245 and 247.
Figure 6B:
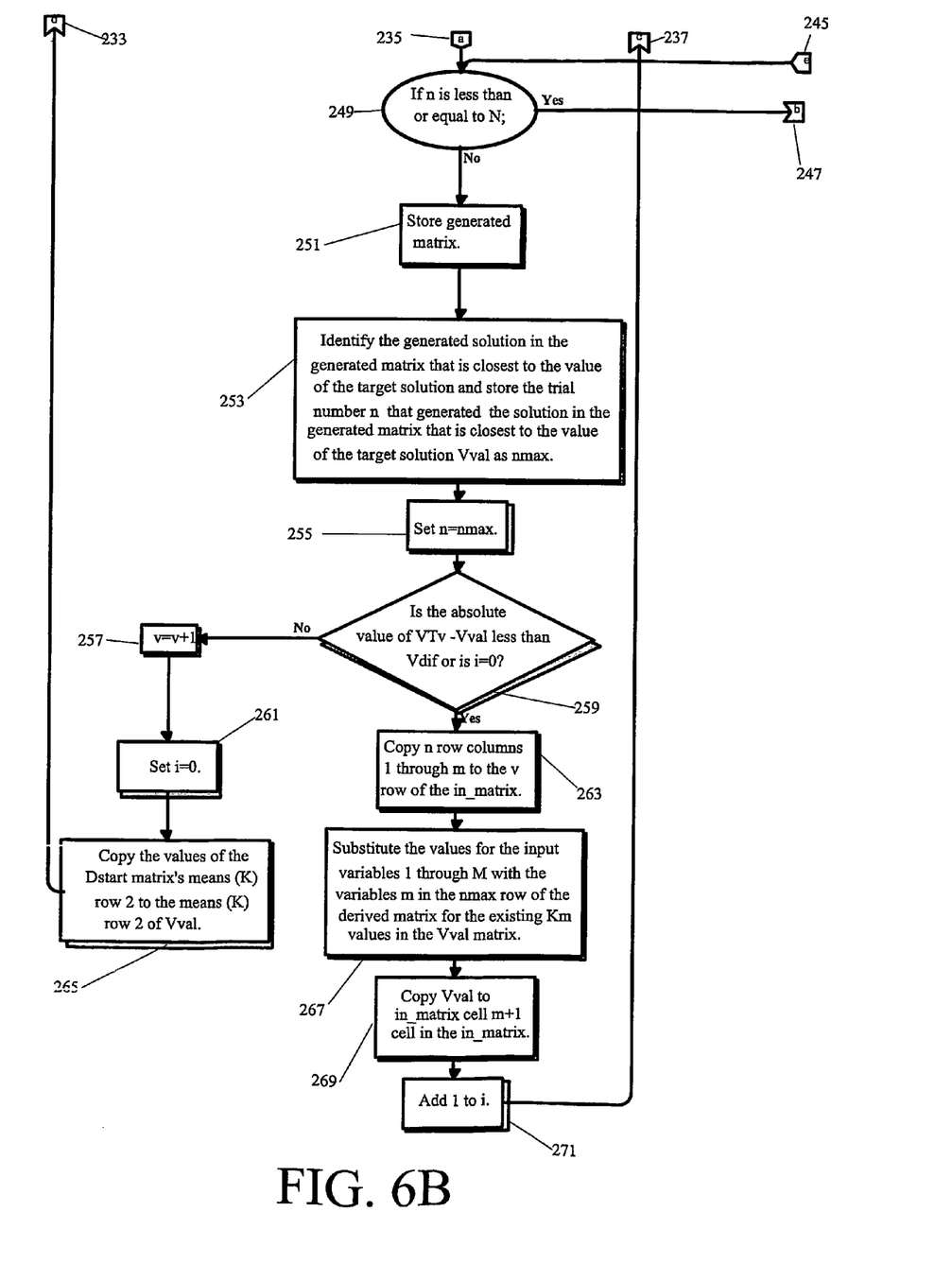
Figure 6C:
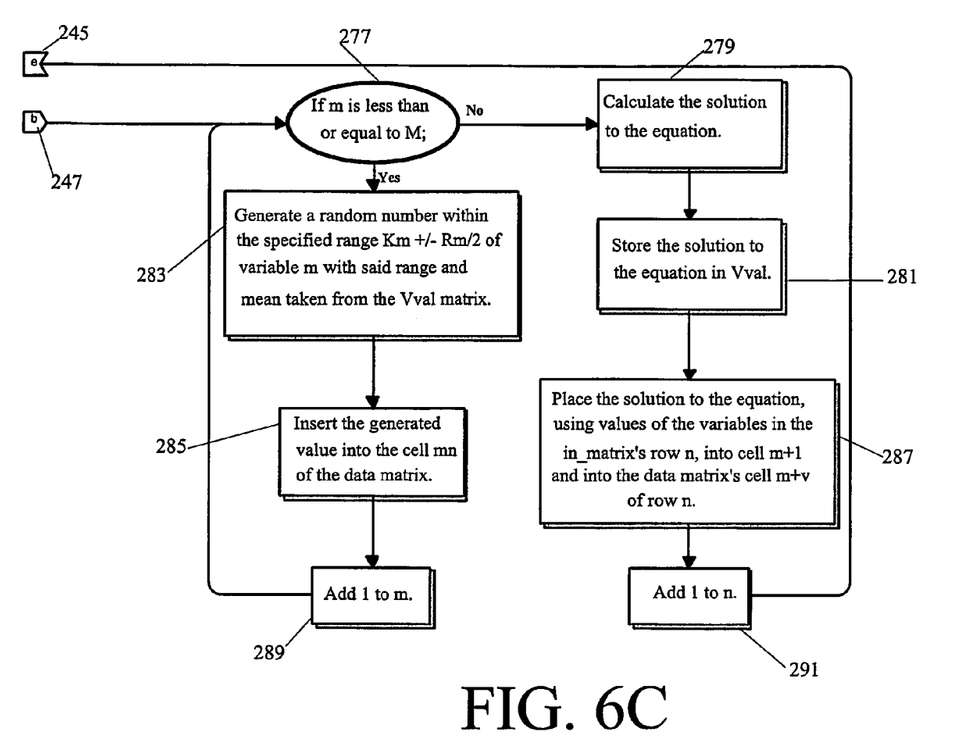

The first steps in the process to improve the output of the Meta Model (see FIGS. 6A, 6B and 6C), are to create an empty base/data matrix 215, to create an empty in_matrix for running value comparison tests 213 and to perform a number of initializations see 211, 223, 229, and 231. Also, one needs to select at least one target solution to an equation or target solutions to a number of equations and place the target solutions in an array 217. One also selects means and ranges for each input variable 219 and store said means and ranges in a Dstart and Vval matrix 221. The process is similar to creating a base matrix. One begins by using a Monte Carlo simulation to generate random numbers of all input variables for a trial (see steps 277, 283, 285 and 289). Then, using the generated input variable values, a solution for one of the equations is calculated 279 and stored in a variable Vval 281 and in the output variable cell for a trial n in the in_matrix and in the base/data matrix 287. This process is repeated for each trial (see steps 291 and 249) and the generated values are stored in a matrix 251. All the generated output values are compared with the target value and the closest solution to the target value is selected 253 and the trial n of this closest solution is stored 255. If the absolute value of the difference between the closest solution and the target solution is less than prior cycles 259 then the new values are placed in the in_matrix and designated the closest input values 263. These closest input values are substituted for existing means in the Vval matrix 267 and stored in the in_matrix 269. This process is cycled over and over again until there is no decrease in the absolute value of the output compared to prior cycles (see 259 and 271). Once this happens, the next equation with a target value (see 238 and 242) is tested (see 257, 261 and 265). This process is repeated until all target values have been improved see 225 and 227.

Accordingly, one can see that by using the present invention one can use a computer to easily generate a Fuzzy Cognitive Map. This is a marked improvement over the existing hand drawn Fuzzy Cognitive Maps. Any phenomenon that can be described or modeled by an equation or a set of equations can be analyzed through a computer generated Fuzzy Cognitive Map. Moreover, the gradation of analysis of a phenomenon can be increased or decreased by increasing or decreasing the number of fuzzy levels.

Thus the scope of this invention should be determined by the appended claims and their legal equivalents, rather than by any example given in this document.

I claim:

1. A means for creating optimized elements of a device, comprising:
   (a) selecting an equation or set equations that models the behavior of the elements of a device;
   (b) selecting a range for each input variable in said equation or set of equations;
   (c) selecting the number of trials;
   (d) selecting the logical distribution function of each of the said input variables;
   (e) selecting at least two fuzzy level boundaries for each of the said phenomenon;
   (f) generating values for all of said input variables of all of said trials, within said input variable's said range and within said logical distribution, using Monte Carlo simulations;
   (g) solving said equation or equations to produce outputs to produce a Meta Model;
   (h) increasing or decreasing the generated values of one of said input variables by fixed increments for each of said trials;
   (i) solving said equation or equations using the incremented or decremented values of one of said input values;
   (j) identifying the fuzzy level placement within said fuzzy level boundary for each of said outputs generated using said incremented or decremented input values for each of said trials;
   (k) calculating the probability of said fuzzy level placement for one of said outputs by dividing the number of said outputs at each of the said fuzzy levels by the number of said trials;
   (l) categorizing said fuzzy level placements for said output as indicating a positive or negative correlation;
   (m) categorizing the magnitude of said fuzzy level placement when there are more than two of the said fuzzy level boundaries;
   (n) repeating the process steps h through m for each of the remaining input variables;

(o) mapping said correlations and said probabilities of the relationships between said input variables and phenomena in the form of a fuzzy cognitive map; and (p) adjusting the characteristics of said elements of said device, in accordance with said fuzzy cognitive map.

2. A means for creating optimized elements of a device as in claim 1, wherein said device is mechanical.

3. A means for creating optimized elements of a device as in claim 1, wherein said device is electrical.

4. A means for creating optimized elements of a device as in claim 1, wherein said device is optical.

5. A means for creating optimized elements of a device as in claim 1, wherein said device is hydraulic.

6. A means for creating optimized elements of a device as in claim 1, wherein said device is pneumatic.

7. A means for creating optimized elements of a device as in claim 1, wherein said device is magnetic.

8. A means for creating optimized elements of a device as in claim 1, wherein adjusting the characteristics of said elements of said device, in accordance with said fuzzy cognitive map, is done by changing the dimensions of a part of a device.

9. A means for creating optimized elements of a device as in claim 1, wherein adjusting the characteristics of said elements of said device, in accordance with said fuzzy cognitive map, is done by changing the composition of a part of a device.

10. A means for creating optimized elements of a device as in claim 1, wherein adjusting the characteristics of said elements of said device, in accordance with said fuzzy cognitive map, is done by replacing one part with another part.

11. A means for creating optimized elements of a device as in claim 1, wherein adjusting the characteristics of said elements of said device, in accordance with said fuzzy cognitive map, is done by altering the design of a part.

12. A means for creating optimized elements of a device as in claim 11, wherein adjusting the characteristics of said elements of said device, in accordance with said fuzzy cognitive map, is done by altering the design of a part in response to the mechanical dynamics of said part.

13. A means for creating optimized elements of a device as in claim 11, wherein adjusting the characteristics of said elements of said device, in accordance with said fuzzy cognitive map, is done by altering the design of a part in response to the fluid dynamics of said part.

14. A means for creating optimized elements of a device as in claim 11, wherein adjusting the characteristics of said elements of said device, in accordance with said fuzzy cognitive map, is done by altering the design of a part in response to the thermodynamics of said part.

15. A means for creating optimized elements of a device as in claim 11, wherein adjusting the characteristics of said elements of said device, in accordance with said fuzzy cognitive map, is done by altering the design of a part in response to the electromagnetics of said part.

16. A means for predicting the behavior of a target population under given conditions, comprising:

(a) selecting an equation or set equations that models the behavior of a population;

(b) selecting a range for each input variable in said equation or set of equations;

(c) selecting the number of trials;

(d) selecting the logical distribution function of each of the said input variables;

(e) selecting at least two fuzzy level boundaries for each of the said phenomenon;

(f) generating values for all of said input variables of all of said trials, within said input variable's said range and within said logical distribution, using Monte Carlo simulations;

(g) solving said equation or equations to produce outputs to produce a Meta Model;

(h) increasing or decreasing the generated values of one of said input variables by fixed increments for each of said trials;

(i) solving said equation or equations using the incremented or decremented values of one of said input values;

(j) identifying the fuzzy level placement within said fuzzy level boundary for each of said outputs generated using said incremented or decremented input values for each of said trials;

(k) calculating the probability of said fuzzy level placement for one of said outputs by dividing the number of said outputs at each of the said fuzzy levels by the number of said trials;

(l) categorizing said fuzzy level placements for said output as indicating a positive or negative correlation;

(m) categorizing the magnitude of said fuzzy level placement when there are more than two of the said fuzzy level boundaries;

(n) repeating the process steps h through m for each of the remaining input variables;

(o) mapping said correlations and said probabilities of the relationships between said input variables and phenomena in the form of a fuzzy cognitive map; and (p) predicting the behavior of a target population by examining said fuzzy cognitive map.

17. A means for predicting the behavior of a target population under given conditions as in claim 16, wherein said population is human.

18. A means for predicting the behavior of a target population under given conditions as in claim 17, wherein said prediction is used to create a report that estimates the effectiveness of an advertisement campaign.

19. A means for predicting the behavior of a target population under given conditions as in claim 17, wherein said prediction is used to create a report that estimates a product's usage pattern.

20. A means for predicting the behavior of a target population under given conditions as in claim 17, wherein said prediction is used to create a report that estimates a commodity's usage pattern.

21. A means for predicting the behavior of a target population under given conditions as in claim 17, wherein said prediction is used to create a report that estimates a service's usage pattern.

22. A means for predicting the behavior of a target population under given conditions as in claim 16, wherein said prediction is used to create a report that estimates a product's usage pattern.

23. A means for predicting the behavior of a target population under given conditions as in claim 16, wherein said population is not human.

24. A means for predicting the behavior of a target population under given conditions as in claim 23, wherein said prediction is used to create a report that estimates the behavior of livestock.

25. A means for predicting the behavior of a target population under given conditions as in claim 23, wherein said prediction is used to create a report that estimates the growth of plants.

26. A means for predicting the behavior of a target population under given conditions as in claim 16, wherein said prediction is used to adjust the data in a computer program to change the computer's output.

27. A means for processing electro-magnetic signals, comprising:
(a) selecting an equation or set equations that models the behavior of electromagnetic signal;
(b) selecting a range for each input variable in said equation or set of equations;
(c) selecting the number of trials;
(d) selecting the logical distribution function of each of the said input variables;
(e) selecting at least two fuzzy level boundaries for each of the said phenomenon;
(f) generating values for all of said input variables of all of said trials, within said input variable's said range and within said logical distribution, using Monte Carlo simulations;
(g) solving said equation or equations to produce outputs to produce a Meta Model;
(h) increasing or decreasing the generated values of one of said input variables by fixed increments for each of said trials;
(i) solving said equation or equations using the incremented or decremented values of one of said input values;
(j) identifying the fuzzy level placement within said fuzzy level boundary for each of said outputs generated using said incremented or decremented input values for each of said trials;
(k) calculating the probability of said fuzzy level placement for one of said outputs by dividing the number of said outputs at each of the said fuzzy levels by the number of said trials;
(l) categorizing said fuzzy level placements for said output as indicating a positive or negative correlation;
(m) categorizing the magnitude of said fuzzy level placement when there are more than two of the said fuzzy level boundaries;
(n) repeating the process steps h through m for each of the remaining input variables;
(o) mapping said correlations and said probabilities of the relationships between said input variables and phenomena in the form of a fuzzy cognitive map; and
(p) transforming said electro-magnetic signal based on said fuzzy cognitive map into a useful output signals.

28. A means for creating optimized materials, comprising:
(a) selecting an equation or set equations that models the behavior of a material;
(b) selecting a range for each input variable in said equation or set of equations;
(c) selecting the number of trials;
(d) selecting the logical distribution function of each of the said input variables;
(e) selecting at least two fuzzy level boundaries for each of the said phenomenon;
(f) generating values for all of said input variables of all of said trials, within said input variable's said range and within said logical distribution, using Monte Carlo simulations;
(g) solving said equation or equations to produce outputs to produce a Meta Model;
(h) increasing or decreasing the generated values of one of said input variables by fixed increments for each of said trials;
(i) solving said equation or equations using the incremented or decremented values of one of said input values;
(j) identifying the fuzzy level placement within said fuzzy level boundary for each of said outputs generated using said incremented or decremented input values for each of said trials;
(k) calculating the probability of said fuzzy level placement for one of said outputs by dividing the number of said outputs at each of the said fuzzy levels by the number of said trials;
(l) categorizing said fuzzy level placements for said output as indicating a positive or negative correlation;
(m) categorizing the magnitude of said fuzzy level placement when there are more than two of the said fuzzy level boundaries;
(n) repeating the process steps h through m for each of the remaining input variables;
(o) mapping said correlations and said probabilities of the relationships between said input variables and phenomena in the form of a fuzzy cognitive map;
(p) adjusting the chemical and/or the structural characteristics of said material using said fuzzy cognitive map; and
(q) synthesizing said material to produce a product.

29. A means for optimizing a process, comprising:
(a) selecting an equation or set equations that models the behavior of a process;
(b) selecting a range for each input variable in said equation or set of equations;
(c) selecting the number of trials;
(d) selecting the logical distribution function of each of the said input variables;
(e) selecting at least two fuzzy level boundaries for each of the said phenomenon;
(f) generating values for all of said input variables of all of said trials, within said input variable's said range and within said logical distribution, using Monte Carlo simulations;
(g) solving said equation or equations to produce outputs to produce a Meta Model;
(h) increasing or decreasing the generated values of one of said input variables by fixed increments for each of said trials;
(i) solving said equation or equations using the incremented or decremented values of one of said input values;
(j) identifying the fuzzy level placement within said fuzzy level boundary for each of said outputs generated using said incremented or decremented input values for each of said trials;
(k) calculating the probability of said fuzzy level placement for one of said outputs by dividing the number of said outputs at each of the said fuzzy levels by the number of said trials;
(l) categorizing said fuzzy level placements for said output as indicating a positive or negative correlation;
(m) categorizing the magnitude of said fuzzy level placement when there are more than two of the said fuzzy level boundaries;
(n) repeating the process steps h through m for each of the remaining input variables;
(o) mapping said correlations and said probabilities of the relationships between said input variables and phenomena in the form of a fuzzy cognitive map; and
(p) adjusting said process, using said fuzzy cognitive map, to optimize said process.

30. The means for optimizing a process in claim 29, wherein said process is use for the preparation of plans for the design of a facility that manufactures product.

31. The means for optimizing a process in claim 29, wherein said process is used to create a document that serves as a template for the organization of a company.

32. The means for optimizing a process in claim 29, wherein said process is a chemical process.

33. The means for optimizing a process in claim 29 wherein, said process output is used to adjust the data in a computer program to change the computer's output.

\* \* \* \* \*